Aug. 7, 1928.

W. S. KNUDSEN 1,679,977

APPARATUS FOR CUTTING VALVE STEMS

Original Filed April 2, 1925

INVENTOR
WILLIAM S. KNUDSEN
BY
ATTORNEYS

Patented Aug. 7, 1928.

1,679,977

UNITED STATES PATENT OFFICE.

WILLIAM S. KNUDSEN, OF DETROIT, MICHIGAN, ASSIGNOR TO GENERAL MOTORS CORPORATION, OF DETROIT, MICHIGAN, A CORPORATION OF DELAWARE.

APPARATUS FOR CUTTING VALVE STEMS.

Original application filed April 2, 1925, Serial No. 20,165. Divided and this application filed February 6, 1926. Serial No. 86,553.

The present invention relates to a process of making headed articles, i. e., articles consisting of a more or less slender shank or spindle provided at one end with a head or portion of a greater lateral dimension. It relates particularly to the manufacture of poppet valves, bolts, screws, and the like.

The present application is a division of my application for poppet valves, filed April 2, 1925, Ser. No. 20,165. That application is directed to the valve making process. This application aims to secure protection on an apparatus used in connection with the process.

The present process is one of extrusion and comprises, broadly, the production in one operation of a head and shank of the proper sizes, requiring only the finishing step of surfacing by grinding or otherwise.

After the making of the valve by the process of extrusion, as explained in my copending application above referred to, the valve stem must be cut to the desired length and this application is more particularly concerned with the apparatus to accomplish this result.

Figure 1:
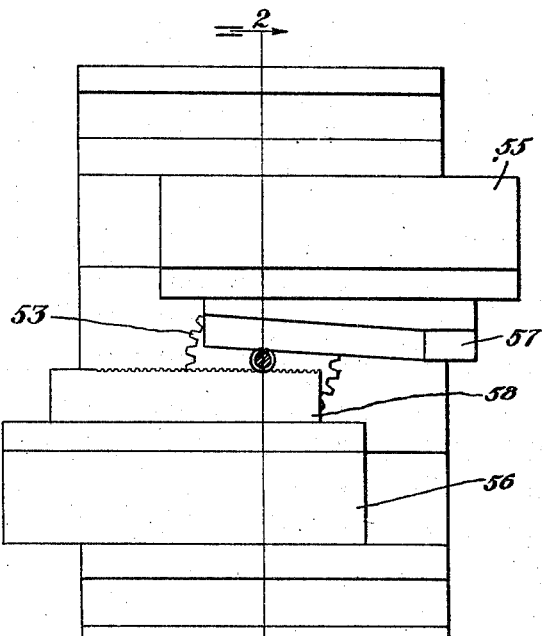
Figure 1 is an elevation of the cutting off mechanism with the cover plate removed.
Figure 2:
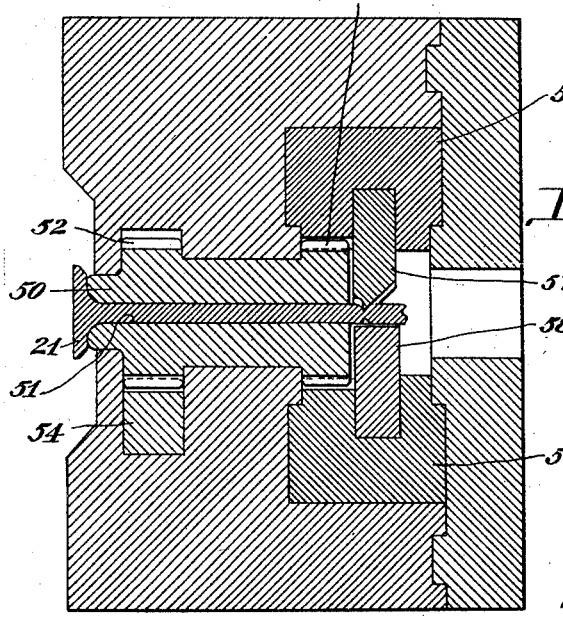
Figure 2 is a sectional view of the same on line 2—2 of Figure 1.

After the valve or its equivalent, designated in Figure 2 as 21, is formed by the extrusion process, it is then cut off to the proper length in a machine such as is shown in the drawing. In this machine, a member 50 serving as a double gear and also as a locater and holder for valve 21, is provided with a longitudinal passage 51 for the valve 21 and upon its periphery with the two gears 52 and 53. Gear 52 is driven from a suitable source of power through rack 54 while gear 53 drives two other racks 55 and 56. These racks 55 and 56 carry respectively a knife 57 and an anvil 58. When power is applied to rack 54 to rotate member 50, the knife 57 will move over the valve 21 and, as the knife edge slopes as shown, will cut off the end of valve 21, anvil member 58 moving in synchronism with the knife and supporting the piece during the cut.

After the stem is cut to the desired length, it may be provided with the usual openings and finished for use in the usual manner.

I claim:

1. An apparatus for cutting off the stem of a valve, or the like, comprising means for rotating said stem including a carrier provided with a pinion and a rack engaging said pinion, cutting means, and mechanism for reciprocating said cutting means simultaneously with the actuation of said first named rotating means.

2. An apparatus for cutting off the stems of valves, or the like, comprising a rotatably mounted member carrying the stem projecting therefrom, cutting means including a cutting member and an anvil mounted for opposite reciprocating movements adjacent the projecting end of the stem, means to rotate the carrier and simultaneously reciprocate the cutting means.

3. An apparatus for cutting off a stem comprising a frame, a carrier rotatably mounted therein, the carrier having an axial opening through and beyond which the stem may project, a pair of reciprocating members for cutting the stem adjacent the end of the carrier from which the stem projects, cooperating means on the carrier and cutting members to oppositely reciprocate the latter upon rotation of the carrier.

4. An apparatus for cutting the stem valve, or the like, comprising a frame, a rack reciprocating therein, a stem carrier rotatably mounted in the frame having a pinion engaging the rack, the stem carrier having an axial aperture through and beyond which the stem extends, a pair of cooperating members for cutting the stem, mounted for reciprocation in the frame adjacent the projecting end of the stem, a second pinion on the carrier and rack teeth on each member cooperating with the second pinion of the carrier whereby reciprocation of the actuating rack rotates the carrier and oppositely reciprocates the members to cut the stem carried by the stem carrier.

5. An apparatus for cutting a valve stem comprising a carrier mounted for rotation and carrying a stem projecting axially therebeyond, members mounted to reciprocate transversely of the axis of the carrier, and diametrically engaging the projecting stem one member being in the form of an anvil, the other having a sloping knife edge, means to rotate the carrier and simultaneously and oppositely reciprocate the anvil and knife members to cut the stem.

6. An apparatus for cutting a valve stem comprising a rotatable carrier carrying the valve stem projecting axially therebeyond, the carrier having a driven pinion, a reciprocating rack for driving the pinion and rotating the carrier, a pair of opposed cutting members constituted by a sloping knife and an anvil mounted on racks reciprocating transversely of the axis of the carrier and engaging the stem, a second pinion on the carrier engaging the racks of the cutting members whereby the movement of the first mentioned rack rotates the carrier and oppositely reciprocates the anvil and knife to cut the stem.

7. In a stem cutting machine, a double pinion rotatable stem carrier having a driven and a driving pinion, means engaging the driven pinion to rotate the carrier, and cutting means driven by the driving pinion to cut the stem.

In testimony whereof I affix my signature.

W. S. KNUDSEN.